R. D. McDONALD.

Bake-Pan.

No. 133,377. Patented Nov. 26, 1872.

Witnesses:
A. Bennerendorf.
Geo. W. Mabee

Inventor:
R. D. McDonald
per
Attorneys.

UNITED STATES PATENT OFFICE.

RICHARD D. McDONALD, OF JERSEY CITY, NEW JERSEY.

IMPROVEMENT IN BAKE-PANS.

Specification forming part of Letters Patent No. 133,377, dated November 26, 1872.

*To all whom it may concern:*

Be it known that I, RICHARD D. McDONALD, of Jersey City, in the county of Hudson and State of New Jersey, have invented a new and useful Improvement in Roasting and Baking Pans, of which the following is a specification:

This invention relates to apparatus to be placed in ovens for baking bread or roasting meats, and all similar purposes; and it consists in the mode of connecting the parts together, or more definitely in a beveled flange around the edge of the upper part of the pan, as will be hereinafter more fully described.

Figure 1:
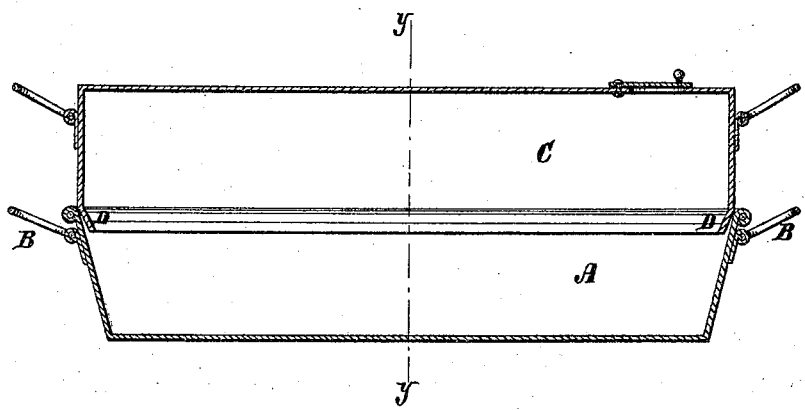
Figure 2:
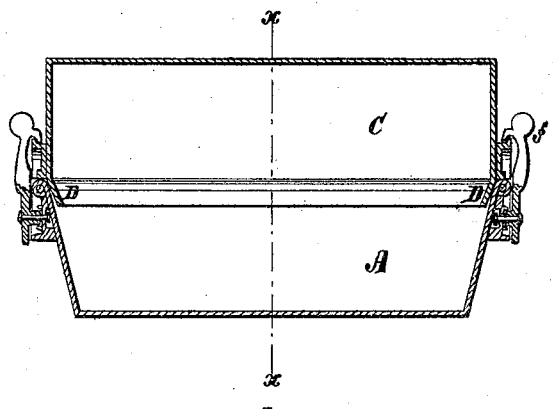
Figure 3:
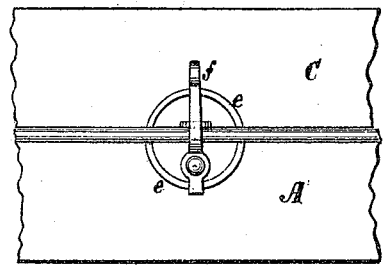

In the drawing, Figure 1 represents a vertical longitudinal section of the pan taken on the line $x\,x$ of Fig. 2. Fig. 2 is a cross-section of Fig. 1 taken on the line $y\,y$. Fig. 3 is a section, showing the fastening.

Similar letters of reference indicate corresponding parts.

A is the base or lower portion of the pan, the sides and ends of which are beveling as baking-pans are ordinarily made. This part is provided with proper handles B B for convenience in using. C is the upper portion of the pan, which is made with vertical sides and ends, with an inwardly-inclining beveled flange, D, around its entire edge, as seen in Figs. 1 and 2. The angle of this flange, from a vertical line, is designed to be about the same as that of the sides and ends of the lower part A of the pan, and is designed to form, with the lower part, a tight joint, so as to confine the gases or steam generated in the pan from the article being roasted or baked.

The construction may be such that the flange D may be on the lower instead of the upper portion, but I prefer the arrangement shown.

The two parts of the pan may be fastened together in any manner. In this example of my invention, I use a metallic semicircle, $e$, on each part, at either the sides or ends, with a revolving hook, $f$, attached to the lower semicircle, the arrangement being plainly seen in Figs. 2 and 3.

I do not confine myself to any particular device for this purpose, nor to the precise form or arrangement of any of the parts described, as variations may be made without departing from my invention.

Having thus described my invention, I claim as new and desire to secure by Letters Patent—

The body A of a roasting-pan, in combination with a cover, C, having the tapered flange D held down firmly into the mouth of said body, as and for the purpose described.

RCHD. D. McDONALD.

Witnesses:
    T. B. MOSHER,
    GEO. W. MABEE.